Patented June 1, 1937

2,082,134

UNITED STATES PATENT OFFICE 2,082,134

PRODUCTION OF CALCIUM HYDRIDE

Peter Popow Alexander, Marblehead, Mass.

No Drawing. Application November 19, 1935,
Serial No. 50,569

2 Claims. (Cl. 23—204)

This invention relates to a process for the manufacture of calcium hydride.

Since the original researches in 1890 by Professor Henri Moissan who prepared calcium hydride by passing a stream of hydrogen at the temperature of red heat over solid pieces of metallic calcium, this compound has been studied by many investigators.

Among the several proposed methods for the manufacture of this compound, only one, developed and patented by G. F. Joubert and Electrochemische Werke, Bitterfeld (German Patent #188,570, 1905) proved to be operative and commercially successful.

The calcium hydride manufactured by this method from metallic calcium which is partly reoxidized is expensive. Yet because until recent years this compound was used only for military purposes the high cost was not a great objection. But for use in metallurgical processes such as are described in my Patent No. 2,038,402 issued April 21, 1936 and assigned to the General Electric Company, a compound available at a low price is necessary.

Attempts to develop methods for the production of calcium hydride directly from either the chloride or the oxide of that element have not met with success up to the present.

Attempts to use calcium carbide did not meet with success and at best could produce a product contaminated with carbon. To avoid the above-described difficulties and to provide a process which would supply that compound at a low price I developed a method for the production of calcium hydride from calcium oxide and hydrogen in the presence of metallic magnesium.

In the absence of hydrogen the reaction $CaO+Mg=Ca+MgO$ cannot take place since oxygen has a greater affinity for calcium than for magnesium. In an atmosphere of hydrogen, however, the heat of reaction between hydrogen and calcium is sufficient to carry the reaction to completion.

The reaction can be represented by the equation:

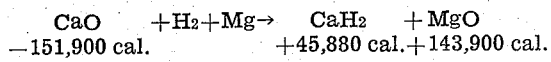

The heat of dissociation of calcium oxide is 151,900 calories and the heats of formation of calcium hydride and magnesium oxide are respectively 45,880 and 143,900 which gives an excess of 37,880 calories. Therefore, as soon as the components are brought to a temperature of about 650° C. the reaction takes place and proceeds to completion without a supply of additional energy. The excess of heat liberated by the reaction is comparatively small so that the temperature does not reach 1100° C. at which calcium hydride dissociates even in a hydrogen atmosphere.

Every pound of calcium hydride requires for its formation 9.3 cubic feet of hydrogen. Therefore as soon as the reaction starts the pressure of hydrogen drops to a very low value, and the reaction stops. To continue the reaction it is necessary to admit a new supply of hydrogen.

By regulating the speed of admission of hydrogen and by measuring the volume of admitted gas it is possible not only to regulate the speed of the reaction but also to know with great accuracy the amount of calcium hydride produced at any moment of the operation. As soon as the calculated volume of hydrogen is consumed the operation is completed and the products can be withdrawn from the furnace.

The amount of magnesium necessary to produce one pound of calcium hydride is 0.57 pound. The present cost of magnesium manufactured on a large scale in this country is 30¢ per pound. Therefore the cost of magnesium consumed in the production of one pound of calcium hydride is 17¢. Since the present cost of imported metallic calcium (none is produced in this country or Canada) is $1.60 per pound it is evident that my process provides a simple and economical method which makes available a useful product which is not available at present in this country.

The usefulness of my process is further indicated by the fact that metallic magnesium, although it possesses excellent reducing properties, can not be used in many metallurgical processes since it alloys with practically any metal, whereas calcium hydride which during the metallurgical operation is dissociated into nascent hydrogen and nascent calcium, possesses still greater reducing properties and does not have the above undesirable properties of magnesium.

Example #1

To illustrate the above description of my process I will describe now in detail two methods of practicing my process. For the purpose of preparing a small amount of calcium hydride for the reduction of thorium oxide, for example, I proceed as follows.

Eighty grams of powdered magnesium metal prepared by filing an ingot of that metal with a rough file, are mixed in a large mortar with 300 grams of calcium oxide thoroughly dried by calcination. The molal proportion of magnesium to calcium oxide is 128 to 300. The surplus of calcium oxide is used in this case in order to eliminate any possibility of unconsumed metallic magnesium left after treatment.

The mixture is placed in a steel crucible which is inserted into a cylindrical nichrome retort provided with a vacuum-tight cover bolted to it. The cover is provided with a thin nichrome pipe which connects the retort by means of stopcocks either with a vacuum pump or hydrogen tank or a V shaped glass tube half filled with mercury, serving as a vacuum and pressure gauge.

After evacuating all the air from the retort it is filled with hydrogen to the pressure exceeding atmospheric pressure by 4 or 5 inches of mercury. Then the retort is inserted into an electric furnace and the temperature is gradually raised to 700° C.

At first one observes by the gauge a uniform increase in the pressure of hydrogen in the retort due to expansion of the gas. As has been established by a number of investigators, magnesium does not absorb hydrogen and does not form any hydrides, yet when it is in a finely divided state and especially when mixed with powdered oxides of magnesium or calcium it adsorbs on its surface an appreciable amount of hydrogen. As the temperature rises the rate of increase of the pressure decreases.

As the temperature approaches the melting point of magnesium there is a sudden release of hydrogen adsorbed on the surface of the particles, which is indicated by the very large increase of the hydrogen pressure. If the temperature of the whole reacting mass is brought to 651° C. too rapidly the release of the adsorbed hydrogen occurs so rapidly that the contents of the crucible are projected out of it and the hydrogen pressure is sufficient to break the mercury gauge and the rubber tubings connecting it to the retort.

However if the temperature is being raised slowly the release of adsorbed hydrogen proceeds gradually. During this period of five or six minutes the excess hydrogen is allowed to escape from the retort so that the pressure of the gas is maintained substantially constant.

Immediately after this period of rapid evolution of hydrogen the reaction takes place. There is a rapid absorption of a large volume of hydrogen indicated by the fall of the mercury column in the gauge. The retort is then connected with the hydrogen tank and that gas is continually supplied to the retort. The end of the absorption of hydrogen is indicative of the end of the reaction. The time of transformation of CaO and Mg into CaH₂ and MgO depends on the fineness of the powder used, the uniformity of mixing and the amount of excess of calcium oxide present in the mixture. Usually it requires about one quarter of an hour. After this period it is useful to raise the temperature of the furnace further to 800° C.–900° C. and rotate or oscillate the retort in the furnace so as to produce a more thorough mixing of the reacting powders.

After cooling to room temperature the contents of the crucible are removed simply by tilting the crucible, since they are in a state of very fine, loose, not-sintered powder.

*Example #2*

The detailed description of the operation on a small scale in Example #1 makes clear the reasons for the adaptation of a special technique for operation on a large scale.

In this case instead of powdered magnesium this metal is used in ingots which are fused and then sprayed or mixed gradually with the powdered calcium oxide.

A charge of calcined and powdered calcium oxide is placed in a horizontal cylindrical nichrome retort filled with hydrogen and heated in the electric furnace to the temperature of 800° C.

The magnesium ingot is fused in a steel pipe occupying the central axis of the horizontal retort. This pipe is provided with a row of small holes in its upper part. After the magnesium has been fused the retort is given a rotating or oscillating movement. Every time the row of small holes comes down a small amount of molten magnesium is poured out through the holes and mixes with the powdered calcium oxide. The speed of rotation of the retort determines therefore the amount of molten magnesium which comes in contact with the calcium oxide. This provides another means of regulating and controlling the speed of reaction.

The progress of the reaction and the amount of calcium hydride is accurately determined by the amount of hydrogen consumed.

Similarly, other compounds, the metals of which form hydrides, which are not completely reduced with magnesium in vacuum or in a neutral atmosphere, are completely reduced when the operation is carried on in hydrogen at the temperature at which the corresponding hydride is formed.

The calcium hydride produced by the action of hydrogen and magnesium on calcium oxide comes in the form of a fine, loose powder. Therefore it was used without further treatment for the reduction of refractory oxides by the method described in my Patent No. 2,038,402 issued April 21, 1936 and assigned to the General Electric Company.

While I have described my improved process with great particularity, and have referred to certain forms of apparatus with which it may be conveniently carried out, it will be understood that the invention is not limited to the use of the specific apparatus described but that reference to the same is made herein so that those skilled in the art may readily practice the invention.

Modifications of the process described above may occur to those skilled in the art, but such are contemplated by me as forming a part of my invention.

What I claim as new and desire to secure by Letters Patent of the United States, is:—

1. The method of production of calcium hydride by a simultaneous action of hydrogen and magnesium on calcium oxide which comprises placing calcium oxide and magnesium in close association in a container filled with hydrogen, raising the temperature above the melting point of magnesium and supplying sufficient hydrogen until all the magnesium is oxidized and the corresponding amount of calcium hydride is formed.

2. The method of production of calcium hydride by a simultaneous action of hydrogen and magnesium which comprises placing calcium oxide in a container filled with hydrogen, raising the temperature above the melting point of magnesium, agitating the calcium oxide in said container, gradually introducing fused magnesium into said container and supplying sufficient hydrogen until all the magnesium is oxidized and the corresponding amount of calcium hydride is formed.

PETER POPOW ALEXANDER.